United States Patent
Kishikawa et al.

(10) Patent No.: US 6,923,495 B2
(45) Date of Patent: Aug. 2, 2005

(54) AUTOMOBILE CAR BODY FRONT CONSTRUCTION AND METHOD OF ASSEMBLING CAR BODY FRONT

(75) Inventors: Shouichi Kishikawa, Hadano (JP); Kenji Furukoshi, Yokohama (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 0 days.

(21) Appl. No.: 10/477,925

(22) PCT Filed: Aug. 7, 2002

(86) PCT No.: PCT/JP02/08090

§ 371 (c)(1),
(2), (4) Date: Nov. 18, 2003

(87) PCT Pub. No.: WO03/074347

PCT Pub. Date: Sep. 12, 2003

(65) Prior Publication Data
US 2005/0088015 A1 Apr. 28, 2005

(30) Foreign Application Priority Data
Mar. 1, 2002 (JP) .............................. 2002-055890

(51) Int. Cl.$^7$ ........................................... B62D 25/08
(52) U.S. Cl. ........................ 296/193.09; 296/193.1; 296/203.02; 180/68.4
(58) Field of Search .................. 296/193.01, 193.04, 296/193.09, 193.1, 198, 203.02; 180/68.4

(56) References Cited

U.S. PATENT DOCUMENTS

| | | | | |
|---|---|---|---|---|
| 4,940,281 A | * | 7/1990 | Komatsu | 296/193.09 |
| 5,303,973 A | * | 4/1994 | Fujii | 296/203.02 |
| 5,429,412 A | * | 7/1995 | Schoen et al. | 296/29 |
| 6,196,624 B1 | * | 3/2001 | Bierjon et al. | 296/193.09 |
| 6,450,276 B1 | * | 9/2002 | Latcau | 180/68.4 |
| 6,523,886 B2 | * | 2/2003 | Hoffner et al. | 296/203.02 |
| 6,540,284 B2 | * | 4/2003 | Miyata | 296/203.02 |
| 6,619,419 B1 | * | 9/2003 | Cheron et al. | 180/311 |
| 6,626,483 B2 | * | 9/2003 | Ozawa et al. | 180/68.1 |
| 6,715,573 B2 | * | 4/2004 | Emori et al. | 180/68.4 |

(Continued)

FOREIGN PATENT DOCUMENTS
JP 2-721143 6/1990

(Continued)

Primary Examiner—Patricia L. Engle
(74) Attorney, Agent, or Firm—McDermott Will & Emery LLP

(57) ABSTRACT

In a front body structure of a vehicle and an assembling method of a front body of a vehicle, head-lamp units (6) disposed at both vehicular widthwise sides of a radiator core support panel (1), respectively, are made into movable structures positionally adjustable to front fenders (8), thereby allowing to attach the head-lamp units (6) to the front fenders (8) on the basis of the latter, respectively, and to uniformalize clearances, offset-amounts and the like in parting portions between the head-lamp units (6) and the front ends of the front fenders (8).

11 Claims, 10 Drawing Sheets

U.S. PATENT DOCUMENTS

| | | | |
|---|---|---|---|
| 6,729,008 B2 * | 5/2004 | Nishijima | 29/458 |
| 6,729,424 B2 * | 5/2004 | Joutaki et al. | 180/68.4 |
| 6,769,853 B2 * | 8/2004 | Perrot | 411/553 |
| 2002/0117875 A1 * | 8/2002 | Hoffner et al. | 296/194 |
| 2002/0195839 A1 * | 12/2002 | Nishijima | 296/194 |
| 2003/0168888 A1 * | 9/2003 | Decker et al. | 296/198 |
| 2004/0174047 A1 * | 9/2004 | Henderson et al. | 296/193.09 |

FOREIGN PATENT DOCUMENTS

| | | |
|---|---|---|
| JP | 4-8029 | 3/1992 |
| JP | 8-258744 | 10/1996 |
| JP | 11-20543 | 1/1999 |
| JP | 11-48856 | 2/1999 |
| JP | P2001-158285 A | 6/2001 |

* cited by examiner

FIG. 10A
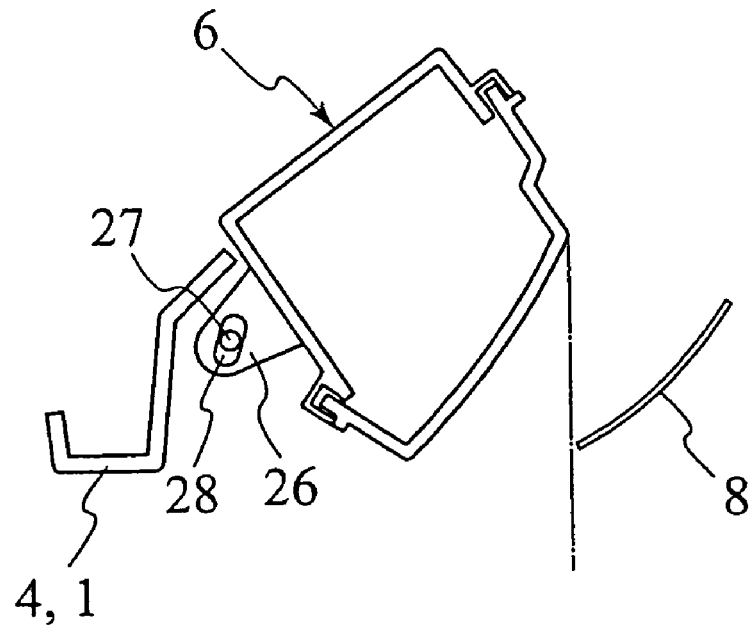
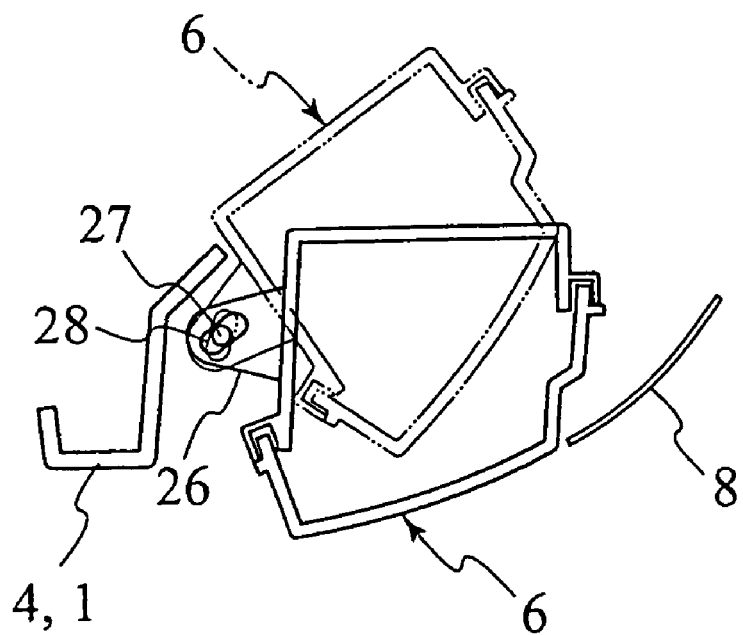
FIG. 10B

AUTOMOBILE CAR BODY FRONT CONSTRUCTION AND METHOD OF ASSEMBLING CAR BODY FRONT

TECHNICAL FIELD

The present invention relates to a front body structure of a vehicle and an assembling method of a front body of a vehicle.

BACKGROUND ART

Recently, in order to simplify an assembling process of vehicular bodies and to automatize the mounting operations, for example, it has been proposed to mount head-lamp units, a front bumper and the like onto a radiator core support panel to thereby constitute a so-called front-end module as a sub-assembly, and to mount the front-end module onto a front body of a vehicle in a vehicular body assembling line (see Japanese Patent Application Laid-Open Publication Nos. H11-20543 and H11-48856).

However, it is probable that the clearances, offset-amounts and the like in parting portions between the head-lamp units and the front ends of front fenders become non-uniform to thereby deteriorate the external appearance, such as due to a cumulation of mounting precision errors between the radiator core support panel and the front side members and front fenders, and of mounting precision errors between the radiator core support panel and the head-lamp units.

From such a standpoint, it is therefore an object of the present invention to provide a front body structure of a vehicle and an assembling method of a front body of a vehicle, without any non-uniform clearances and non-uniform offset-amounts in parting portions between head-lamp units and front ends of front fenders, thereby enabling to further improve the external appearance.

DISCLOSURE OF INVENTION

To achieve the above object, the present invention provides in one aspect a front body structure of a vehicle, comprising: a radiator core support panel; and head-lamp units mounted at both vehicular widthwise sides of the radiator core support panel, respectively; wherein the radiator core support panel is coupled to front fenders and front side members; and wherein the head-lamp units are made into movable structures positionally adjustable to the front fenders, respectively.

According to such a constitution, the head-lamp units can be positionally adjusted to and attached to the front fenders on the basis of the latter, respectively, thereby enabling to uniformalize the clearances and offset-amounts in parting portions between the head-lamp units and the front ends of the front fenders, respectively, to thereby further improve the external appearance.

It is preferable to provide such a constitution that the radiator core support panel is divided into an upper member and a lower member, the upper member having both vehicular widthwise sides mounted with the head-lamp units, respectively, and the lower member being coupled to front ends of the front side members; and that the upper member and the lower member are coupled to each other pivotably in a vehicular fore-and-aft direction.

According to such a constitution, it becomes possible to deal with a situation for changing a vehicular body design while commonizing a platform, by modifying a formation-related upper member of a radiator core support panel, thereby allowing to exemplarily achieve a reduced cost and an improved development efficiency.

It is more preferable to provide such a constitution that the front body structure of a vehicle further comprises a front bumper mounted to the upper member.

According to such a constitution, the head-lamp units and front bumper are allowed to be integrally made into the movable structure, thereby making it unnecessary to adjust clearances and the like between the head-lamp units and front bumper, to thereby enable to improve an attaching operability.

It is further preferable to provide such a constitution that the radiator core support panel comprises a main portion and side portions at both vehicular widthwise sides of the main portion; that the side portions are constituted dividedly from the main portion and mounted with the head-lamp units, respectively; and that the side portions are coupled to the main portion pivotably in the vehicular widthwise direction and slidably in the vehicular fore-and-aft direction.

According to such a constitution, the side portions of the radiator core support panel are moved and adjusted to allow the right and left head-lamp units to be independently and positionally adjusted correspondingly to the front ends of the right and left front fenders, respectively, thereby enabling to enhance the aligning qualities of the head-lamp units with the front fenders, respectively.

It is additionally preferable to provide such a constitution that the head-lamp units include vehicular widthwise inside portions, respectively, coupled to the radiator core support panel, pivotably in the vehicular widthwise direction and slidably in the vehicular fore-and-aft direction; and that the head-lamp units include vehicular widthwise outside portions provided with coupling portions to the front fenders, respectively.

According to such a constitution, the right and left head-lamp units themselves can be further independently and positionally adjusted correspondingly to the front ends of the right and left front fenders, respectively, thereby enabling to enhance the aligning qualities of the head-lamp units with the front fenders, respectively.

It is further preferable to provide such a constitution that the coupling portions of the head-lamp units at the vehicular widthwise inside portions thereof to the radiator core support panel are provided with attaching points, respectively, for a bumper facer of a front bumper.

According to such a constitution, the necessity of clearance adjustment and the like between the bumper facer of the front bumper and the head-lamp units can be excluded, to thereby improve the attaching operability.

It is preferable to provide such a constitution that the front body structure of a vehicle further comprises upper coupling points and lower coupling points of the radiator core support panel to the front fenders; and that the upper coupling points are provided at vehicular widthwise outside portions of the head-lamp units, respectively.

According to such a constitution, the head-lamp units act as the upper coupling means of the radiator core support panel to the front fenders, thereby allowing to simplify the structure of the radiator core support panel.

Furthermore, the formation of both vehicular widthwise sides of the radiator core support panel is liberated from the formation of the head-lamp units, thereby enabling to readily deal with the formation difference of the head-lamp units and to standardize and commonize the radiator core support panel.

On the other hand, the present invention provides in another aspect an assembling method of a front body of a vehicle, comprising the steps of: coupling a radiator core support panel to front end portions of front side members; moving head-lamp units mounted on the radiator core support panel relative to front fenders, to thereby aligningly adjust the head-lamp units to the front fenders, respectively; and coupling the radiator core support panel to the front fenders.

According to such a constitution, the head-lamp units can be positionally adjusted to and attached to the front fenders on the basis of the latter, respectively, thereby allowing to exemplarily uniformalize the clearances and offset-amounts in parting portions between the head-lamp units and the front ends of the front fenders, respectively, to thereby further improve the external appearance.

The present invention provides in yet another aspect an assembling method of a front body of a vehicle, comprising the steps of: releasing temporary fixation of head-lamp units to thereby render the head-lamp units movable, the head-lamp units having been mounted on both vehicular widthwise sides of a radiator core support panel in a manner pivotable toward vehicular widthwise insides about vehicular widthwise inner coupling points of the head-lamp units and having been temporarily fixed to pedestal members provided at both vehicular widthwise sides of the radiator core support panel, respectively; coupling the radiator core support panel to front end portions of front side members; moving the head-lamp units toward front fenders with pivotal movements of the head-lamp units about the coupling points to thereby aligningly adjust the head-lamp units to the front fenders, respectively; and coupling the radiator core support panel together with the head-lamp units, to the front fenders.

According to such a constitution, the head-lamp units are temporarily fixed to the pedestal members provided on the radiator core support panel to enable to restrict the free movements of the head-lamp units, respectively, while the temporary fixation of the head-lamp units to the pedestal members may be released to thereby enable to aligningly adjust the head-lamp units to the front fenders about the coupling points as fulcra of the head-lamp units, respectively.

Thus, the head-lamp unit are assuredly fixed to thereby enable to avoid an unstable state when the radiator core support panel and head-lamp units in the state of a sub-assembly are transported to a vehicular body assembling line, while the temporary fixation of the head-lamp units is released in the assembling line to thereby enable to precisely mount the head-lamp units to the front fenders by virtue of the inherently movable structures of the head-lamp units, respectively.

The present invention further provides in still another aspect an assembling method of a front body of a vehicle, comprising the steps of: pivoting head-lamp units mounted on both vehicular widthwise sides of a radiator core support panel toward vehicular widthwise insides about vehicular widthwise inner coupling points of the head-lamp units, respectively; abutting and coupling the radiator core support panel to front ends of front side members from the vehicular front, to thereby arrange the head-lamp units at positions inside the front fenders, respectively; moving the head-lamp units toward front fenders with pivotal movements of the head-lamp units about the coupling points to thereby aligningly adjust the head-lamp units to the front fenders, respectively; and coupling the radiator core support panel together with the head-lamp units, to the front fenders.

According to such a constitution, the head-lamp units can be positionally adjusted to and attached to the front fenders on the basis of the latter, respectively, thereby enabling to uniformalize the clearances and offset-amounts in parting portions between the head-lamp units and the front ends of the front fenders, respectively.

Further, it becomes possible to avoid interference of the head-lamp units with the front fenders upon abutting the radiator core support panel to the front ends of the front side members from the vehicular front, thereby allowing to further facilitate the mounting operation.

BRIEF DESCRIPTION OF DRAWINGS

FIG. 10A and FIG. 10B are schematic cross-sectional views of a head-lamp unit successively showing a head-lamp unit attaching process in the corresponding embodiment of the present invention.

BEST MODE FOR CARRYING OUT THE INVENTION

Figure 1:
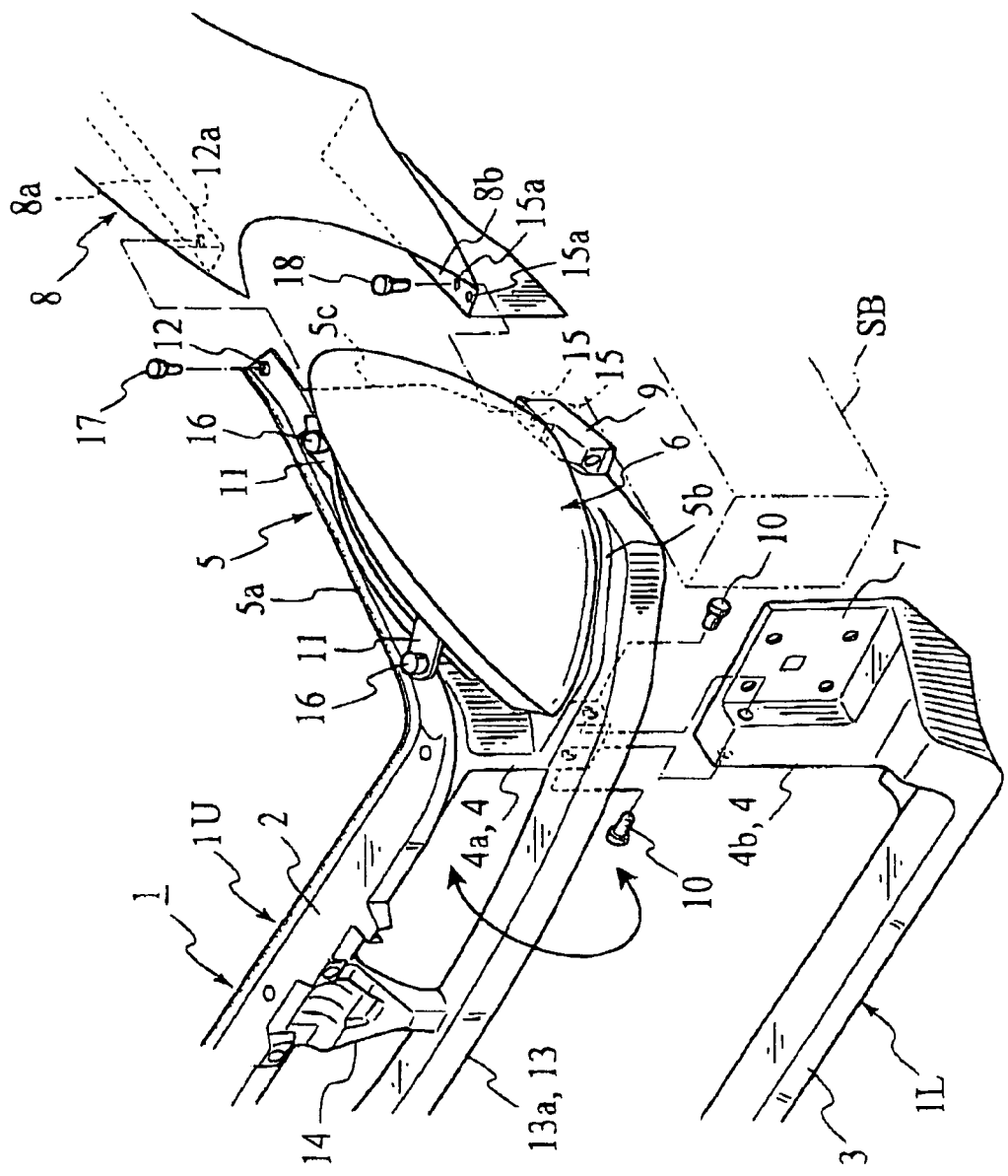
FIG. 1 is an exploded perspective view showing a first embodiment of the present invention.

There will be explained hereinafter the embodiments of the present invention with reference to the accompanying drawings, so as to describe the present invention in more detail. In the following description, those identical elements are designated by the same reference numerals, respectively, and the detailed explanation thereof shall be duly simplified or omitted.

First Embodiment

In FIG. 1, reference numeral 1 designates a radiator core support panel made of a plastic material and constituting a frontmost part of a vehicular body (i.e., front end of vehicular body), and this panel 1 comprises: an upper rail 2 and a first cross-member 3 arranged one above the other, and both extending in a vehicular widthwise direction; pillar portions 4 for interconnecting the upper rail 2 and first cross-member 3 at both vehicular widthwise sides thereof, respectively; and side portions 5 bulgedly provided at the vehicular widthwise outsides of the pillar portions 4, respectively, so as to mount head-lamp units 6 onto the side portions 5 themselves, respectively.

Each side portion 5 comprises an upper frame 5a formed integrally with and as an extension of the upper rail 2, a lower frame 5b laterally bulged from and provided integrally with the pillar portion 4, and a side frame 5c for interconnecting the upper frame 5a and lower frame 5b, such that each side portion 5 is bently formed toward a rearward direction of the vehicular body from the upper rail 2 and pillar portion 4.

Each interconnecting portion between the first crossmember 3 and pillar portion 4 has a vehicular widthwise outer corner portion integrally formed with a fastening seat portion 7.

The radiator core support panel 1 constitutes a front end portion of the vehicular body, by abutting and bolt-fastening each fastening seat portion 7 to a front end of an associated front side member SB acting as a frame member extending in a vehicular fore-and-aft direction joined to and arranged under a lower side of a hood ridge panel (not shown), by fastening by a bolt 17 a rear end portion of the upper frame 5a of each side portion 5 as the extension of the upper rail 2 to a front end portion of an upper flange 8a of an associated front fender 8 joined and fixed to an upper edge of the hood ridge panel, and by fastening each lower frame 5b to a front end portion of a lower flange 8b of the front fender 8 by a bolt 18 through a seat portion 9 formed integrally with a rear outside of the lower frame 5b.

Each head-lamp unit 6 is made into a movable structure positionally adjustable to the front end of the associated front fender 8.

In this embodiment, each head-lamp unit 6 is made into the movable structure positionally adjustable to the front end of the associated front fender 8, by dividing the radiator core support panel 1 into an upper member 1U and a lower member 1L one above the other at vertical intermediate portions of the pillar portions 4, respectively, and by coupling the upper member 1U to the lower member 1L pivotably in the vehicular fore-and-aft direction, while attaching the lower member 1L to the front side members on the basis of the latter and attaching the head-lamp units 6 to the front ends of the front fenders 8, respectively, on the basis of the latter.

Concretely, the upper member 1U is integrally formed of the upper rail 2, upper portions 4a of the pillar portions 4 and the side portions 5 such as by injection molding, while the lower member 1L is integrally formed of the first crossmember 3, lower portions 4b of the pillar portions 4, and the fastening seat portions 7 such as by injection molding.

The upper portion 4a of each pillar portion 4 has a rearwardly opened channel-like "C" shape cross section at least at its lower end, and this lower end of each upper portion 4a is fitted onto an upper end of the associated lower portion 4b in such a manner that the upper end of the associated lower portion 4b is positioned inside the lower end of each upper portion 4a. In this state, the lower end of each upper portion 4a and the upper end of the associated lower portion 4b are coupled together by pins 10 provided in the vehicular widthwise direction, so that the upper member 1U and lower member 1L are pivotable to each other in the vehicular fore-and-aft direction.

In this embodiment, each head-lamp unit 6 is firmly fastened to the associated upper frame 5a and lower frame 6b by bolts 16 through upper and lower bracket pieces 11 (lower bracket pieces are not shown), respectively, such that a bolt through-hole 12 at the rear end portion of each upper frame 5a to be fastened to the front end portion of the associated front fender 8 is established as a so-called clearance hole having a diameter larger than that of the bolt 17, thereby enabling to compensate for a deviation upon attaching adjustment.

In this embodiment, laterally formed across the upper portions 4a of the right and left pillar portions 4 and up to around the lower frames 5b of side portions 5 is an armature portion 13a of a front bumper 13, integrally with the portions 4 and frames 5b. Vertically formed across vehicular widthwise central portions of the upper rail 2 and armature portion 13a is a hood lock stay 14 integrally with these central portions.

The radiator core support panel 1 having such a constitution is delivered into a vehicular body assembling line by previously fastening and fixing the head-lamp units 6 to the side portions 5 of the upper member 1U, respectively, via bracket pieces 11 as described above, and is abutted to and coupled to a front body of a vehicle from the front thereof in the vehicular body assembling line.

Concretely, the fastening seat portions 7 of the lower member 1L are abutted to the front ends of the front side members, respectively, and bolt-fastened to the front side members on the basis of the same.

Then, the upper member 1U is pivoted in the vehicular fore-and-aft direction about the pins 10, and the head-lamp units 6 are positionally adjusted relative to the front ends of the front fenders 8 so as to align the peripheries of the head-lamp units 6 with the peripheries of front ends of the front fenders 8, respectively. Thereafter, the outer seat portions 9 of the lower frames 5b of the side portions 5 are overlapped with lower surfaces of front end portions of the lower flanges 8b of the front fenders 8 and fastened thereto by the bolts 18, respectively, and the rear end portions of the upper frames 5a are overlapped with front end portions of the upper flanges 8a of the front fenders 8 and fastened thereto by the bolts 17, respectively, to thereby attach the upper member 1U to the front end portions of the front fenders 8 on the basis of the latter.

At this time, those deviations of the rear end portions of the upper frames 5a from the upper flanges 8a of the front fenders 8 which are accompanying to the positional adjustment of the head-lamp units 6 are compensated for by the bolt through-holes 12 as clearance holes, respectively.

According to the structure of this embodiment as described above, the head-lamp units 6 can be positionally adjusted to and attached to the front fenders 8 on the basis of the latter, respectively, thereby allowing to exemplarily uniformalize the clearances and offset-amounts in parting portions between the head-lamp units 6 and the front ends of the front fenders 8, respectively, to thereby further improve the external appearance.

Particularly, in this embodiment, the head-lamp units 6 are made into movable structures relative to the front fenders 8 such that the head-lamp units 6 can be positionally adjusted relative to the front ends of the front fenders 8, respectively, by dividing the radiator core support panel 1 into the upper member 1U and lower member 1L one above the other in which the upper member 1U has the side portions 5 mounted with the head-lamp units 6, respectively, and by coupling the upper member 1U and lower member 1L to each other pivotably in the vehicular fore-and-aft direction. This enables to deal with a situation for changing a vehicular body design while commonizing a platform, by modifying a formation-related upper member 1U of a radiator core support panel 1, thereby allowing to exemplarily achieve a reduced cost and an improved development efficiency.

Further, since the upper member 1U is formed integrally with the armature portion 13a of the front bumper 13 which is to be attached with a bumper facer (not shown), the head-lamp units 6 and front bumper 13 are allowed to be integrally made into the movable structure. Thus, adjustingly attaching the head-lamp units 6 to the front bumper 13 in a sub-assembly step makes it unnecessary to adjust clearances and the like between the head-lamp units 6 and front bumper 13 after mounting of the radiator core support panel 1 in a vehicular body assembling line, thereby enabling to improve an attaching operability.

Second Embodiment

Figure 2:
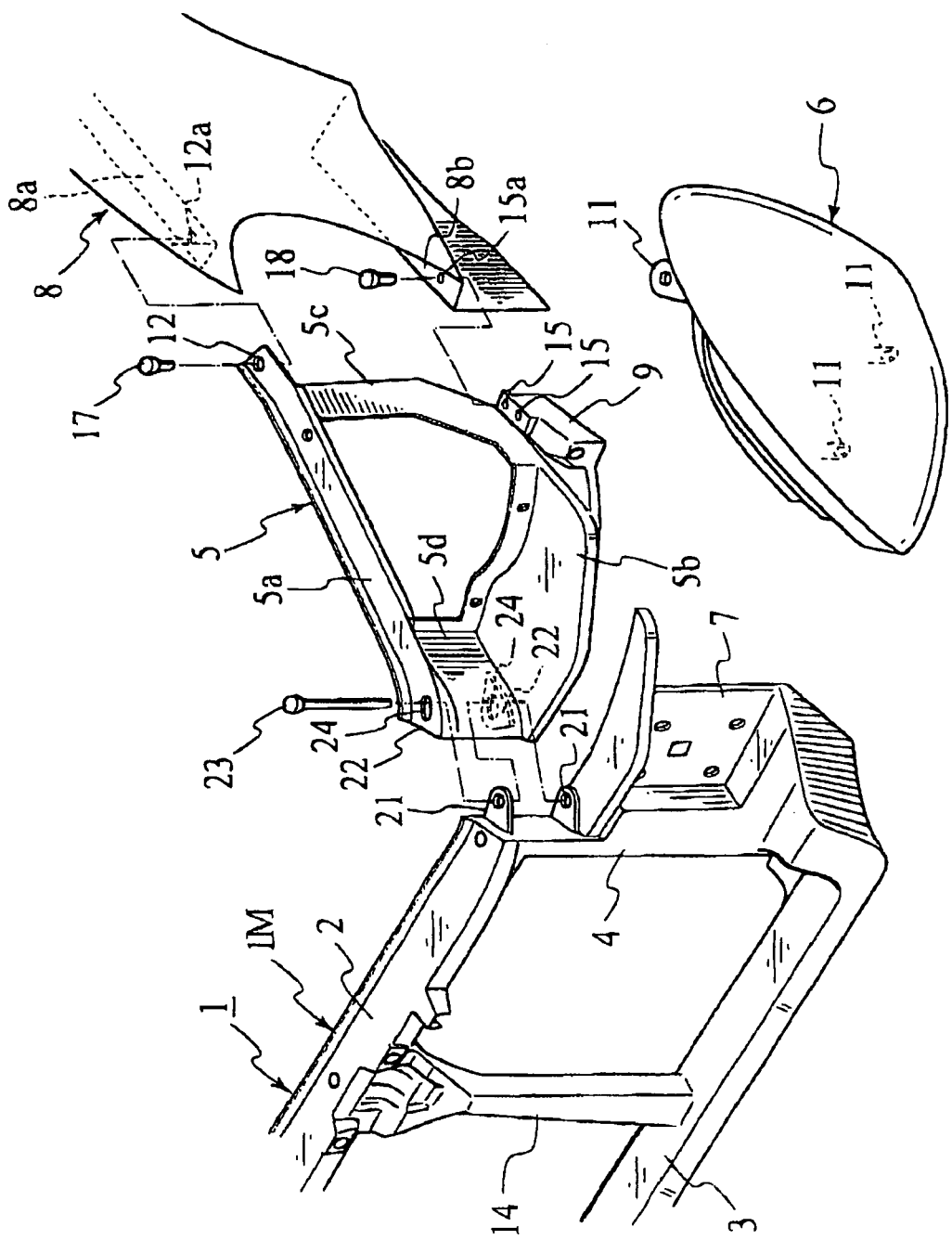
FIG. 2 is an exploded perspective view showing a second embodiment of the present invention.

FIG. 2 shows a second embodiment of the present invention including a radiator core support panel 1 divided into: a main portion 1M comprising an upper rail 2, a first cross-member 3, pillar portions 4, fastening seat portions 7, and a hood lock stay 14, which are formed integrally with one another such as by injection molding; and side portions 5 integrally formed themselves such as by injection molding, and coupled to the main portion 1M pivotably in the vehicular widthwise direction and slidably in the vehicular fore-and-aft direction.

In this embodiment, the hood lock stay 14 is vertically formed across and integrally with vehicular widthwise central portions of the upper rail 2 and first cross-member 3.

The main portion 1M is integrally formed with a pair of upper and lower bracket supporting seats 21 at an upper side surface of each pillar portion 4, while each side portion 5 has a coupling base 5d positioned at a vehicular widthwise inside of the side portion 5 itself and provided with a pair of upper and lower brackets 22, such that these brackets 22 are coupled to the bracket supporting seats 21 via pins 23, respectively, so that each side portion 5 is mounted pivotably in the vehicular widthwise direction.

The brackets 22 have pin through-holes 24 formed as fore-and-aft elongated holes, respectively, and these elongated holes allow the associated side portion 5 to be slidable in the vehicular fore-and-aft direction relative to the main portion 1M.

Identically to the first embodiment, each head-lamp unit 6 is previously fastened to an upper frame 5a and a lower frame 5b of the associated side portion 5 by bolts 16 via bracket pieces 11, respectively.

In this second embodiment, the main portion 1M of the radiator core support panel 1 is bolt-fastened to front side members on the basis of the latter, by abutting the fastening seat portions 7 of the main portion 1M to the front ends of the front side members, respectively.

Then, each side portion 5 is pivoted in the vehicular widthwise direction about the associated pin 23 and slid in the vehicular fore-and-aft direction within the elongated range of the pin through-holes 24 of the associated brackets 22, so as to positionally adjust the associated head-lamp unit 6 relative to the front end of an associated front fender 8, thereby aligning the periphery of the head-lamp unit 6 with the front end periphery of the front fender 8.

The alignment of the periphery of each head-lamp unit 6 with the front end periphery of the associated front fender 8 directly leads to the alignment of a bolt through-hole 12 at the rear end portion of the upper frame 5a with a bolt through-hole 12a at a front end portion of an upper flange 8a of the front fender 8, and leads to the alignment of a due bolt through-hole 15 of a seat portion 9 of the lower frame 5b with a bolt through-hole 15a at the front end portion of a lower flange 8b of the front fender 8. Thus, each side portion 5 is attached and bolt-fastened to the front end portion of the associated front fender 8 on the basis of this front end portion by inserting bolts 17, 18 through the above-mentioned bolt through-holes, respectively, thereby enabling to exemplarily uniformalize clearances and offset-amounts in a parting portion between the head-lamp unit 6 and front fender 8.

To this end, the bolt through-hole 12 at the rear end portion of each upper frame 5a is formed not into a clearance hole but into a hole having a diameter fitted to the outer diameter of the associated bolt 17, in this embodiment.

In this way, the structure of the second embodiment makes the side portions 5 of the radiator core support panel 1 into movable structures in which these side portions 5 are moved and adjusted to allow the right and left head-lamp units 6 to be independently and positionally adjusted correspondingly to the front ends of the right and left front fenders 8, respectively, thereby enabling to enhance the aligning qualities of the head-lamp units 6 with the front ends of the front fenders 8, respectively.

Third Embodiment

Figure 3:
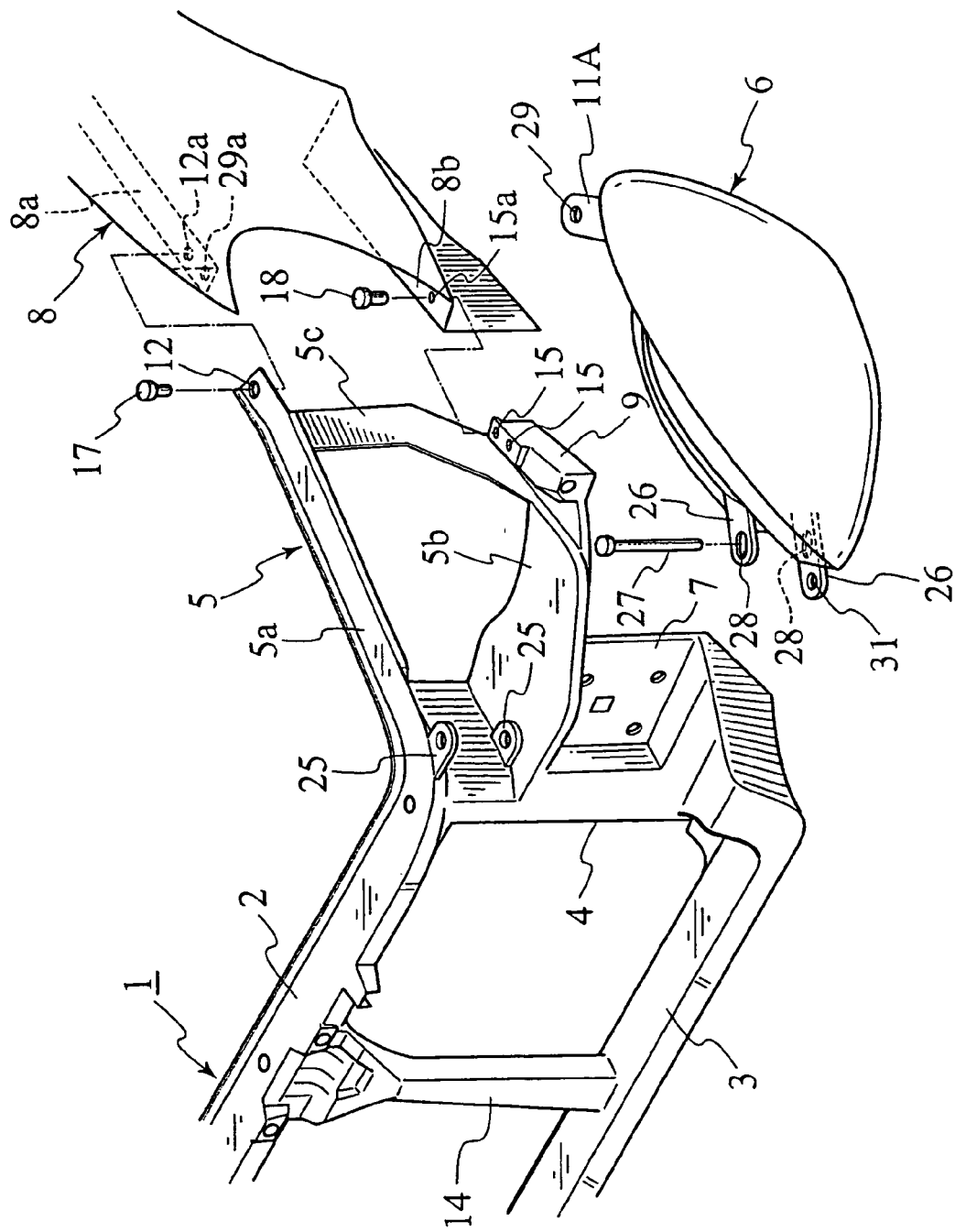
FIG. 3 is an exploded perspective view showing a third embodiment of the present invention.

FIG. 3 shows a third embodiment of the present invention including a radiator core support panel 1 integrally formed of an upper rail 2, a first cross-member 3, pillar portions 4, side portions 5, fastening seat portions 7 and a hood lock stay 14 such as by injection molding, and each side portion 5 is movably mounted with a head-lamp unit 6.

Also in this embodiment, the hood lock stay 14 is vertically formed across and integrally with vehicular widthwise central portions of the upper rail 2 and first cross-member 3.

Each side portion 5 comprises an upper frame 5a and a lower frame 5b having forming bases at vehicular widthwise insides thereof integrally formed with bracket supporting seats 25, respectively, while each head-lamp unit 6 includes a vehicular widthwise inside portion protrudedly provided with a pair of upper and lower brackets 26, such that these brackets 26 are coupled to the bracket supporting seats 25 via pins 27, respectively, thereby mounting each head-lamp unit 6 to the associated side portion 5 pivotably in the vehicular widthwise direction.

The brackets 26 include pin through-holes 28 formed as fore-and-aft elongated holes, respectively, and these elongated holes allow the associated head-lamp unit 6 to be slidable in the vehicular fore-and-aft direction relative to the associated side portion 5.

Further, provided at an upper edge portion of a vehicular widthwise outside portion of each head-lamp unit 6 is a bracket piece 11A as a coupling portion for the associated front fender 8, and formed at the front end portion of an upper flange 8a of each front fender 8 is a bolt through-hole 12a as well as a bolt through-hole 29a adjacent to a front side of the bolt through-hole 12a, such that the bracket piece 11A is bolt-fastened directly to the associated upper flange 8a by aligning a bolt through-hole 29 of the bracket piece 11A with the bolt through-hole 29a of the upper flange 8a and by inserting a bolt 16 through these bolt through-holes.

In this embodiment, the lower one of the pair of upper and lower brackets 26, 26 provided at the vehicular widthwise inside portion of each head-lamp unit 6 is formed with a setting hole 31 as an attaching point of a bumper facer (not shown) of a front bumper, so that the bumper facer is attached via setting holes 31.

In this third embodiment, the radiator core support panel 1 is bolt-fastened to the front side members by abutting the fastening seat portions 7 to the front ends of the front side members, respectively, and the rear end portions of the upper frames 5a of the side portions 5 are overlapped with upper surfaces of the upper flanges 8a and the seat portions 9 of lower frames 5b are overlapped with lower surfaces of lower flanges 8b of the front fenders 8 and fastened by the bolts 17, 18, respectively, so that the radiator core support panel 1 is attached to the front side members and front fenders 8 on the basis of these members and fenders.

Further, each head-lamp unit 6 is pivoted in the vehicular widthwise direction about the associated pin 27 and is slid in the vehicular fore-and-aft direction within the elongated range of the pin through-holes 28 of the associated brackets 26, and the head-lamp unit 6 is positionally adjusted relative to the front end of the associated front fender 8, thereby aligning the periphery of the head-lamp unit 6 with the front end periphery of the front fender 8.

The alignment of the periphery of the head-lamp unit 6 with the front end periphery of the associated front fender 8 directly leads to the alignment of the bolt through-hole 29 of the bracket piece 11A provided at the upper edge of the vehicular widthwise outside portion of the head-lamp unit 6 with the bolt through-hole 29a of the upper flange 8a of the front fender 8, so that the head-lamp unit 6 can be attached and bolt-fastened to the front end portion of the front fender 8 on the basis of the latter by inserting the bolt 16 through these bolt through-holes 29, 29a, thereby allowing to obtain the same effect as the second embodiment.

Further, in this embodiment, the bumper facer of the front bumper is previously attached to the attaching points 31 of the brackets 26 of the head-lamp units 6, thereby exemplarily excluding the necessity of clearance adjustment between the bumper facer and the head-lamp units 6, to thereby improve the attaching operability.

Fourth Embodiment

Figure 4:
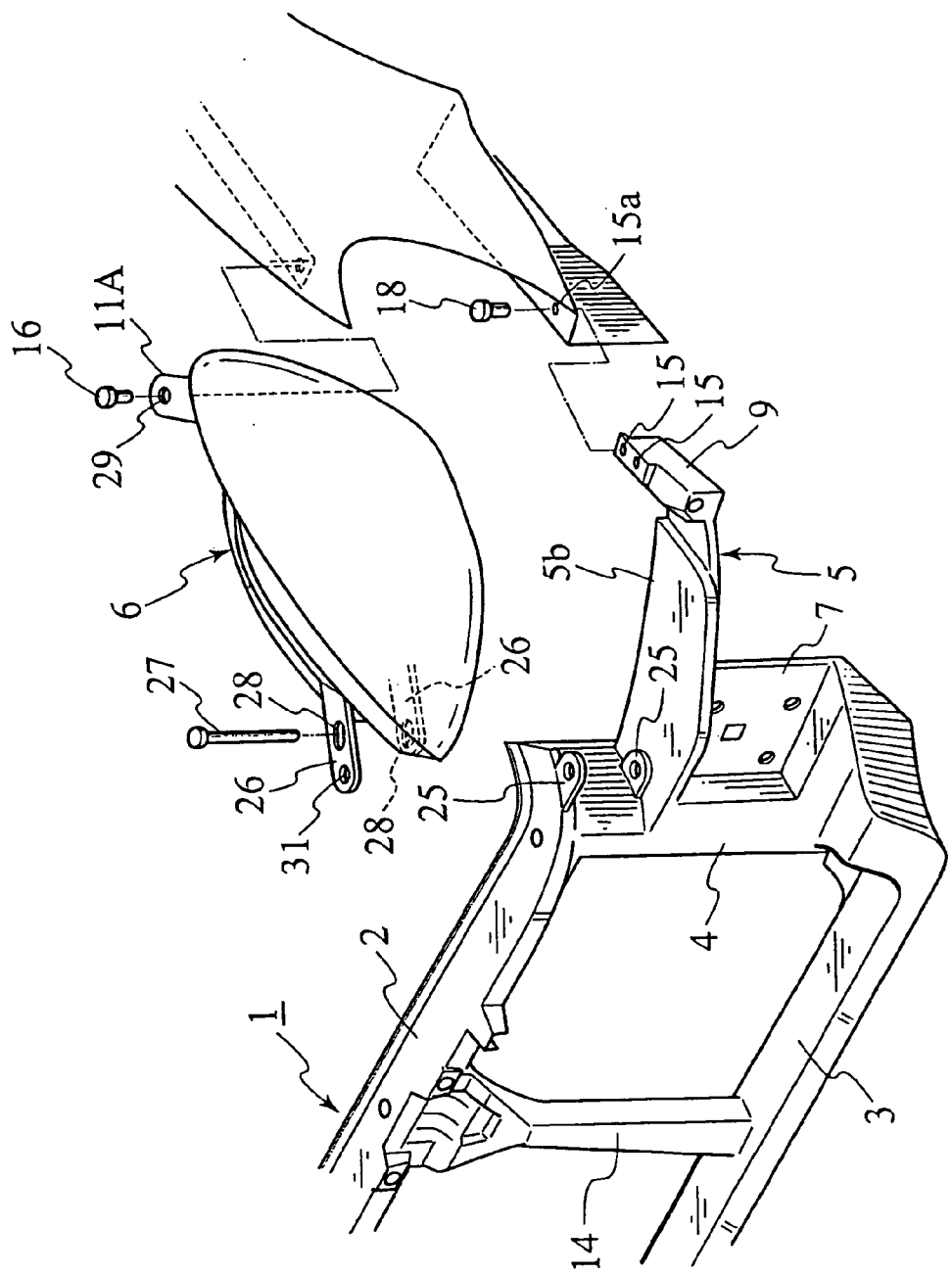
FIG. 4 is an exploded perspective view showing a fourth embodiment of the present invention.

FIG. 4 shows a fourth embodiment of the present invention, which omits the upper frame 5a and side frame 5c of the side portion 5 in the third embodiment, while the upper coupling point and lower coupling point of the radiator core support panel 1 relative to the associated front fender 8 are constituted of a seat portion 9 of a lower frame 5b and a bracket piece 11A provided at a vehicular widthwise outside portion of each head-lamp unit 6, so that the head-lamp unit 6 also acts as upper coupling means of the radiator core support panel 1 to the front fender 8.

This embodiment includes a bumper facer of a type different from that in the third embodiment, so that each head-lamp unit 6 includes an upper bracket 26 provided with a setting hole 31 by which the bumper facer is attached.

Thus, the structure of the fourth embodiment allows to obtain the same effect as the third embodiment. Further, since each head-lamp unit 6 also acts as the upper coupling means of the radiator core support panel 1 to the front fender 8 as described above, the upper frame 5a and side frame 5c of the associated side portion 5 can be omitted, thereby allowing to simplify the structure of the radiator core support panel 1.

Furthermore, since the upper frame 5a and side frame 5c of each side portion 5 can be omitted, the formation of each side portion 5 is liberated from the formation of the associated head-lamp unit 6, thereby enabling to readily deal with the formation difference of the head-lamp unit 6 and to standardize and commonize the radiator core support panel 1.

Fifth Embodiment

Figure 5:
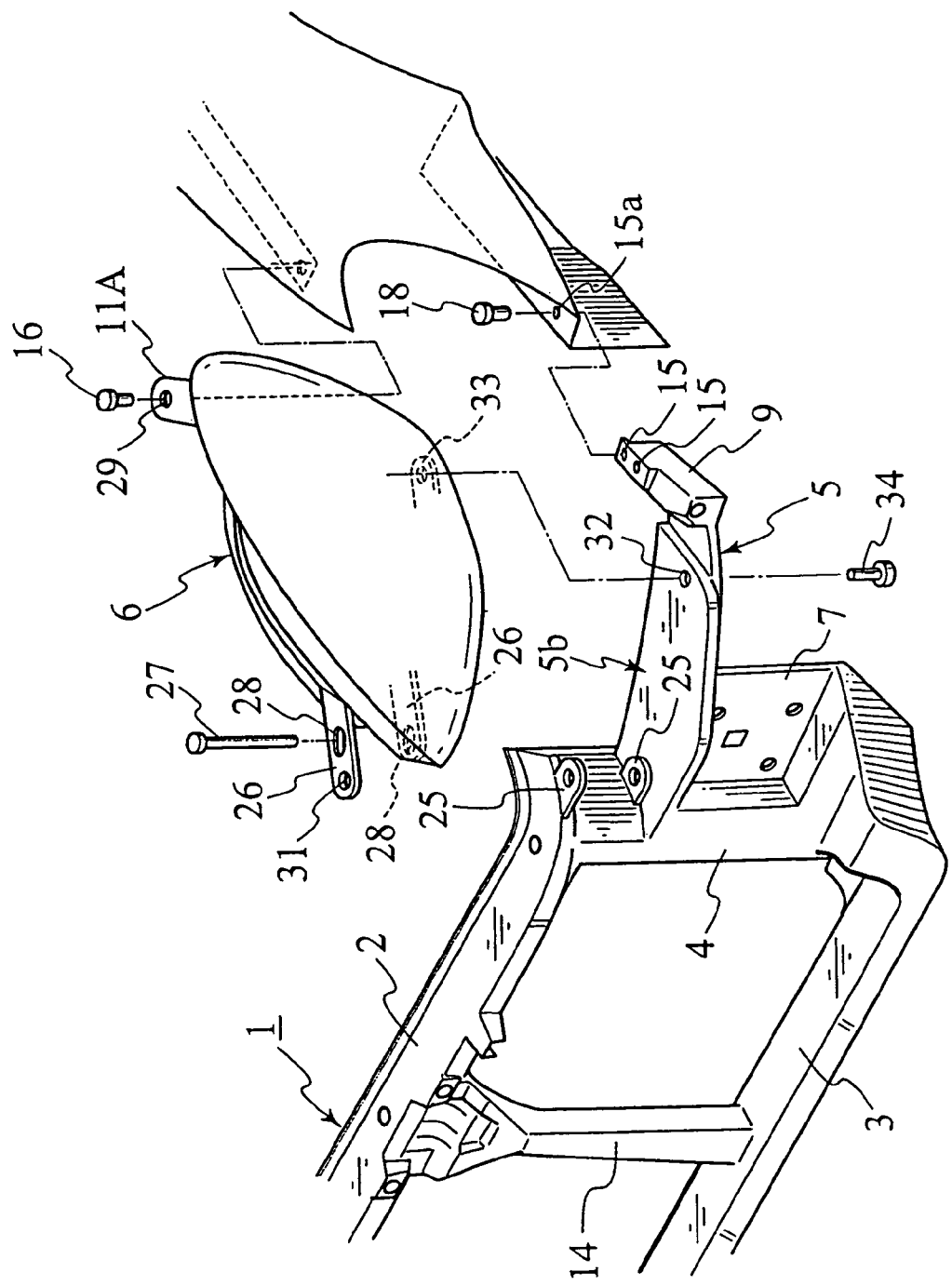
FIG. 5 is an exploded perspective view showing a fifth embodiment of the present invention.
Figure 6:
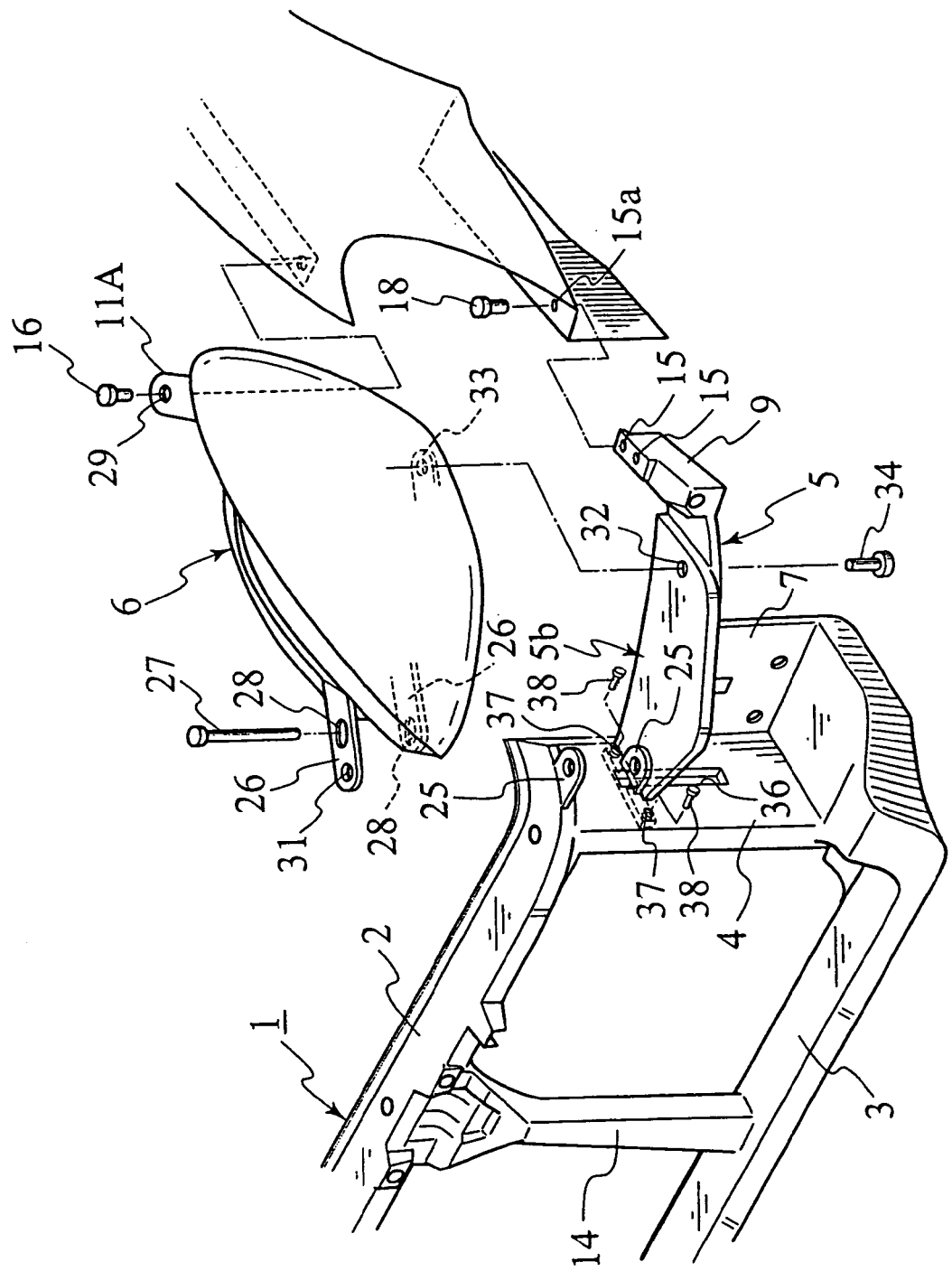
FIG. 6 is an exploded perspective view showing a sixth embodiment of the present invention.
Figure 7A:
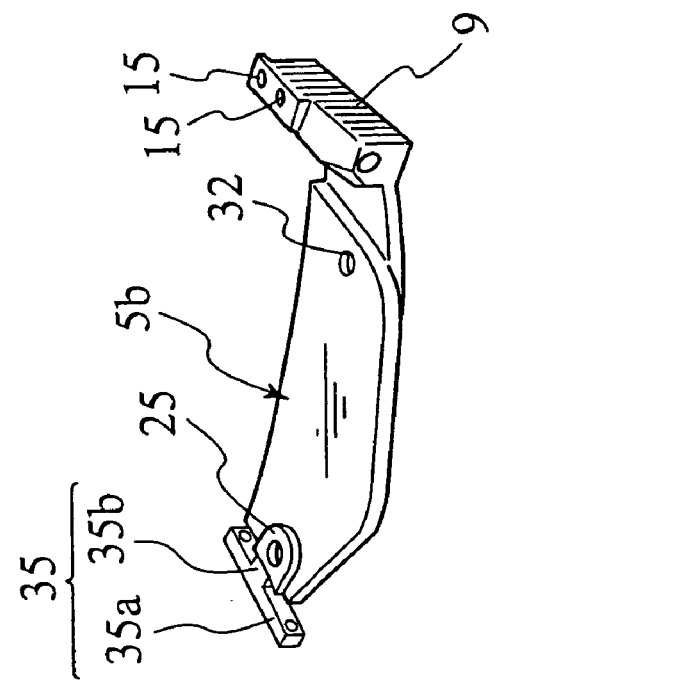
FIG. 7A is a view showing a radiator core support panel 1 before coupling a pedestal member thereto in the sixth embodiment of the present invention.
Figure 7B:
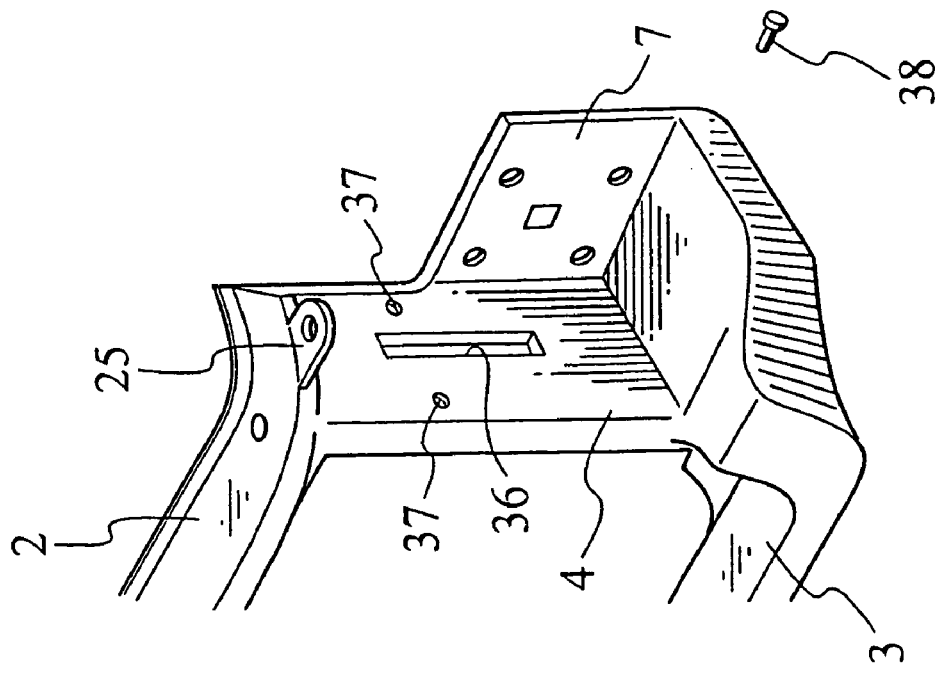
FIG. 7B is a view showing the pedestal member before coupled to the radiator core support panel in the sixth embodiment of the present invention.

FIG. 5 shows a fifth embodiment of the present invention, which effectively utilizes the lower frame 5b of each side portion 5 in the fourth embodiment shown in FIG. 4 as a pedestal member for supporting the associated head-lamp unit 6 in a manner to temporarily fix the head-lamp unit 6 onto the pedestal member 5b.

Each pedestal member 5b includes a seat portion 9 at its vehicular widthwise outer end and is formed with a bolt through-hole 32 near the seat portion 9, while the associated head-lamp unit 6 includes a lower surface protrudedly provided with a temporary holding bracket 33 at a position corresponding to the bolt through-hole 32.

Further, each head-lamp unit 6 is temporarily fixed onto the associated pedestal member 5b by fastening a bolt 34 to the temporary holding bracket 33 through the bolt through-hole 32 of the pedestal member 5b, after the head-lamp unit 6 is mounted to the side portion 5 pivotably in the vehicular widthwise direction by coupling a bracket 26 of the head-lamp unit 6 to a bracket supporting seat 25 of the side portion 5 as described above.

In the fifth embodiment, before the radiator core support panel 1 is abutted and bolt-fastened to front ends of front side members or after such bolt-fastening, each bolt 34 is unthreaded to release the temporary fixation and to enable to move the head-lamp unit 6, and then the above described aligning adjustment of each head-lamp unit 6 to the associated front fender 8 is conducted to thereby fasten and attach the bracket piece 11A and seat portion 9 to the front fender 8.

Thus, the fifth embodiment allows to obtain the same effect as the fourth embodiment. Further, each head-lamp unit 6 is temporarily fixed to the associated pedestal member 5b to enable to restrict the free movement of the head-lamp unit 6 and to prevent an unstable state when the bracket piece 11 and head-lamp units 6 in the state of a sub-assembly are transported to a vehicular body assembling line, thereby allowing to avoid an occurrence of defects such as breakage due to the free movement of the head-lamp units 6 during transportation, and allowing to stably hold the head-lamp units 6 at an initial stage of mounting the radiator core support panel 1 to a front body of a vehicle, thereby enabling to improve the mounting operability.

Sixth Embodiment

FIGS. 6 through 9 show a sixth embodiment of the present invention, in which the pedestal member (lower frame 5b of each side portion 5) in the fifth embodiment shown in FIG. 5 is formed separately from the radiator core support panel 1.

The vehicular widthwise inner end of each pedestal member 5b is integrally formed with the lower one of the pair of upper and lower bracket supporting seats 25 in the fourth embodiment and fifth embodiment, and the pedestal member 5b has its distal portion protrudedly provided with a bracket 35 in a "T" shape in plan view.

Meanwhile, each pillar portion 4 of the radiator core support panel 1 is formed with a vertically elongated slit 36 through which the associated "T" shape bracket 35 is insertable such that the pedestal member 5b is rotatable by a neck portion 35b of a fixing portion 35a of the bracket 35, and the pillar portion 4 is formed with attaching holes 37 at required height positions forwardly and rearwardly of the slit 36, respectively.

Figure 8:
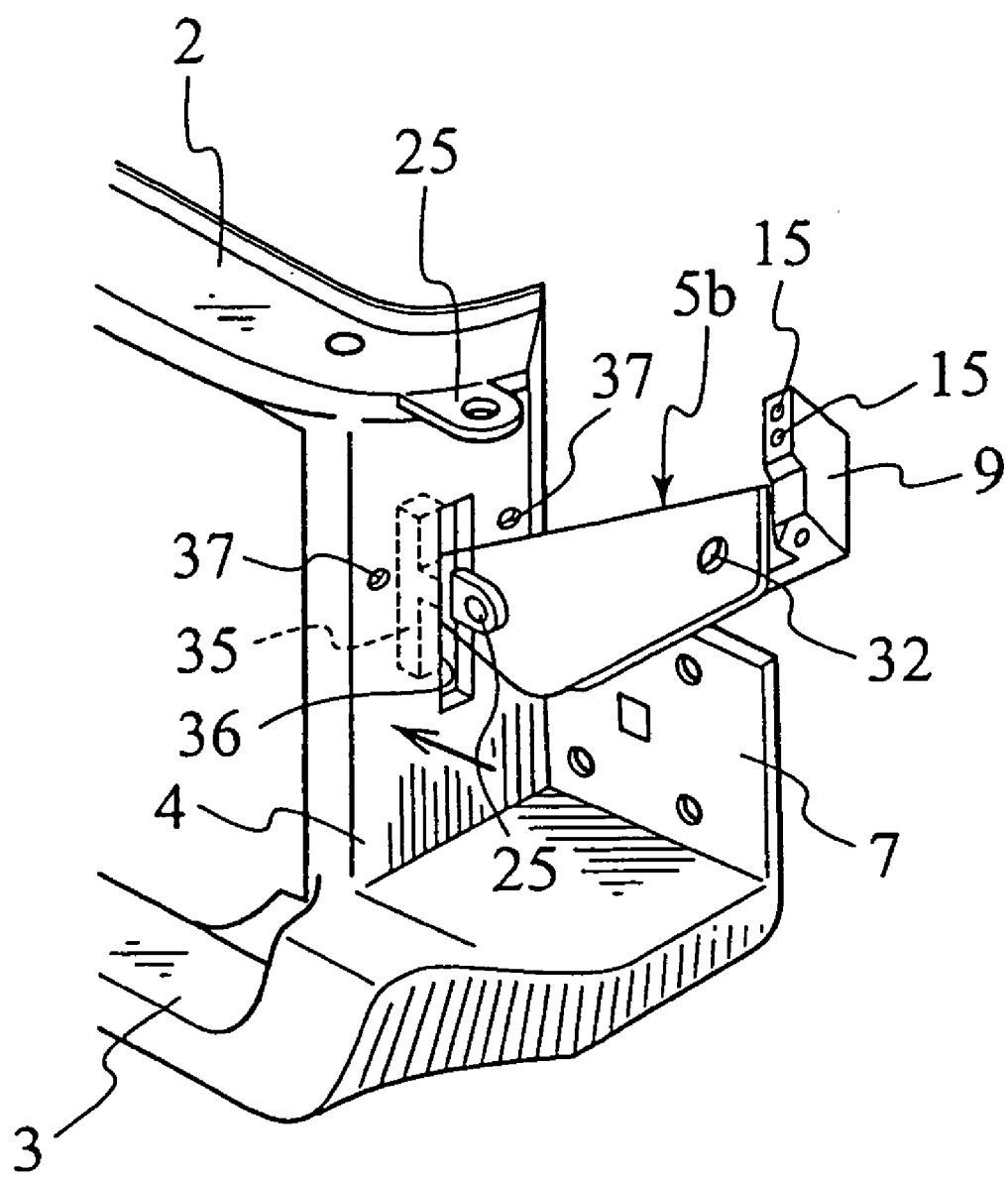
FIG. 8 is a perspective view showing a state in the course of coupling the pedestal member of FIG. 7B to the radiator core support panel of FIG. 7A.
Figure 9:
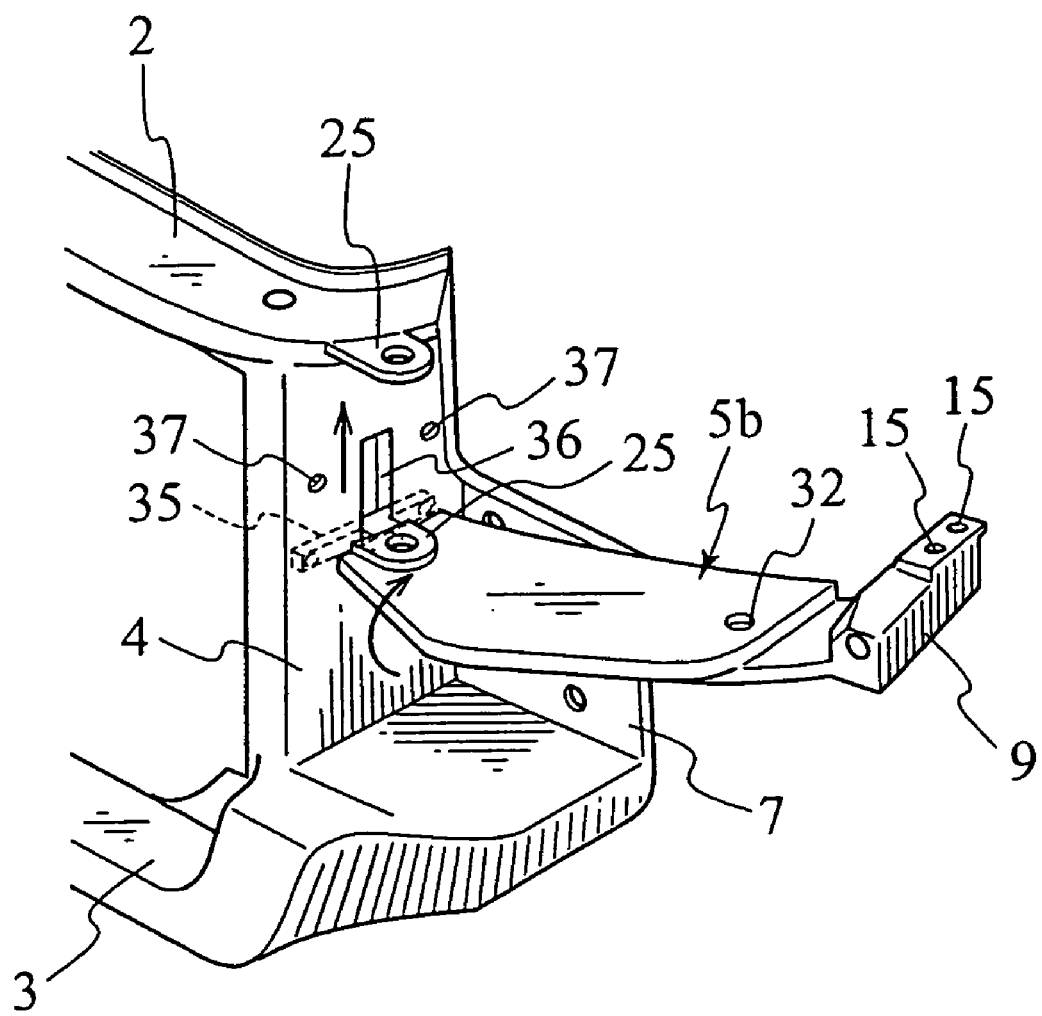
FIG. 9 is a perspective view showing a state in the course of coupling the pedestal member of FIG. 7B to the radiator core support panel of FIG. 7A subsequently to the state of FIG. 8.

As shown in FIG. 8, each pedestal member 5b is vertically oriented and its "T" shape bracket 35 is inserted into the associated slit 36, and then the pedestal member 5b is rotated into a substantially horizontal normal state about the neck portion 35b as shown in FIG. 9. In this state, the fixing portion 35a of the "T" shape bracket 35 is engaged with and restrained by an inner surface of the pillar portion 4, so that the pedestal member 5b can be attached to the radiator core support panel 1 by sliding the pedestal member 5b along the slit 36 up to a required certain height position where the attaching holes 37 are located, and by thereafter fastening and fixing the bracket 35 to the pillar portion 4 by bolts 38 through the attaching holes 37, respectively.

Thus, the structure of the sixth embodiment allows to obtain the same effect as the fifth embodiment. Further, since the laterally protruded pedestal members 5b are absent upon injection molding the radiator core support panel 1, the forming performance can be of course improved, while the outer package shape of the radiator core support panel 1 can be downsized upon transporting the same at a stage before the head-lamp units 6 are mounted to the panel 1 into a state of a sub-assembly, thereby allowing to improve the transporting performance of the panel 1.

Meantime, in the embodiments shown in FIGS. 2, 3, 4, 5 and 6, the pivot center point of each head-lamp unit 6, i.e., the position of the associated pin 23 or 27 is located as inside as possible in the vehicular widthwise direction to thereby increase the pivot radius of the head-lamp unit 6, so that the moving direction of a vehicular widthwise outer edge portion of the head-lamp unit 6 becomes linear, thereby enabling to facilitate to compensate for errors of the head-lamp unit 6 relative to the front end of the associated front fender 8.

Additionally, in the embodiments shown in FIGS. 2, 3, 4, 5 and 6, each head-lamp unit 6 may be previously pivoted toward a vehicular widthwise inside about the associated pin 23 or 27 such as shown in FIG. 10A, upon mounting the radiator core support panel 1 to the front side members and front fenders 8. This enables to avoid interference of each head-lamp unit 6 with the associated front fender 8 upon abutting the radiator core support panel 1 to the front ends of the front side members from the vehicular front, and enables to pivot the head-lamp unit 6 toward the vehicular widthwise outside about the pin 23 or 27 as shown in FIG. 10B, thereby allowing to further facilitate the mounting operation.

INDUSTRIAL APPLICABILITY

According to the present invention as described above, the head-lamp units disposed at both vehicular widthwise sides of the radiator core support panel, respectively, are made into the movable structures positionally adjustable to the front fenders, thereby allowing to attach the head-lamp units to the front fenders on the basis of the latter, respectively, and to uniformalize clearances, of set-amounts and the like in parting portions between the head-lamp units and the front ends of the front fenders, respectively. There can be thus expected a broader applicable scope of the present invention, in addition to the time of assembling a vehicle.

What is claimed is:

1. A front body structure of a vehicle, comprising:
    a radiator core support panel including a movable structure member; and
    head-lamp units mounted on said movable structural member at both vehicular widthwise sides and said radiator core support panel, respectively,
    wherein said radiator core support panel is coupled to front fenders and front side members,
    and wherein said head-lamp units are positionally adjustable to said front fenders to aligningly adjust relation between said head-lamp units and said front fenders while moving at least in a vehicular widthwise direction and a vehicular fore-and-aft direction through said movable structural member of said radiator core support panel, positional relation between said head-lamp units and said movable structural member being maintained, respectively.

2. The front body structure of a vehicle according to claim 1, wherein said radiator core support panel is divided into an upper member and a lower member, said upper member having both vehicular widthwise sides mounted with said head-lamp units, respectively, and said lower member being coupled to front ends and said front side members,
    and wherein said upper member and said lower member are coupled to each other pivotably in said vehicular fore-and-aft direction to allow said upper member to constitute said movable member.

3. The front body structure of a vehicle according to claim 2, further comprising a front bumper mounted to said upper member.

4. The front body structure of a vehicle according to claim 1, wherein said radiator core support panel includes side portions at both vehicular widthwise sides thereof to constitute said movable member,
    wherein said portions are mounted with said head-lamp units, respectively,
    and wherein said side portions are movable pivotably in the vehicular widthwise direction and slidably in the vehicular fore-and-aft direction.

5. The front body structure of a vehicle according to claim 1, wherein said head-lamp units include vehicular widthwise inside portions, respectively, coupled to said radiator core support panel,
    and wherein said head-lamp units include vehicular widthwise outside portions provided with coupling portions toward said front fenders, respectively.

6. The front body structure of a vehicle according to 5, wherein said coupling portions of said head-lamp units at the vehicular widthwise inside portions thereof to said radiator core support panel are provided with attaching points, respectively, for a bumper facer of a front bumper.

7. The front body structure of a vehicle according to 5, further comprising upper coupling points and lower coupling points of said radiator core support panel to said front fenders,
    wherein said upper coupling points are provided at vehicular widthwise outside portions of said head-lamp units, respectively.

8. An assembling method of a front body of a vehicle, comprising:
    coupling a radiator core support panel to front end portions of front side members; said radiator core support panel including a movable structural member and head-lamp units are mounted on said movable structural member at both vehicular widthwise sides of said radiator core support panel, respectively;
    moving head-lamp units relative to front fenders, to thereby aligningly adjust relation between said head-lamp units and said front fenders while moving at least in a vehicular widthwise direction and a vehicular fore-and-aft direction through said movable structural member of said radiator core support panel, respectively, positional relation between said head-lamp units and said movable structural member being maintained; and coupling said radiator core support panel to said front fenders.

9. The assembling method of a front body of a vehicle according to claim 8, further comprising:

temporarily fixing said head-lamp units to pedestal members provided at both vehicular widthwise sides of said radiator core support panel respectively, releasing temporary fixation of said head-lamp units to thereby render said head-lamp units movable, respectively, and coupling said radiator core support panel to said front end portions of said front side members after releasing said temporary fixation.

10. The assembling method of a front body of a vehicle according to claim 8, wherein said head-lamp units are aligningly adjusted while pivoting said head-lamp units mounted on both vehicular widthwise sides of said radiator core support panel toward vehicular widthwise insides about vehicular widthwise inner coupling points of said head-lamp units, respectively.

11. The assembling method of a front body of a vehicle according to claim 8, wherein said radiator core support panel is divided into an upper member and a lower member, said upper member having both vehicular widthwise sides mounted with said head-lamp units, respectively, and wherein said head-lamp units are aligningly adjusted while moving said head-lamp units mounted on said upper member pivotally in said vehicular fore-and-aft direction.

* * * * *